United States Patent [19]

Kusaka et al.

[11] 4,214,757
[45] Jul. 29, 1980

[54] TONE ARM ASSEMBLY

[75] Inventors: Satoshi Kusaka, Tokyo; Kuninori Shino, Higashi-murayama, both of Japan

[73] Assignee: Sony Corporation, Tokyo, Japan

[21] Appl. No.: 36,993

[22] Filed: May 8, 1979

[30] Foreign Application Priority Data

May 8, 1978 [JP] Japan .................. 53-54303

[51] Int. Cl.² .............................. G11B 3/10
[52] U.S. Cl. .................................. 274/23 R
[58] Field of Search ............. 274/23 R, 23 A, 15 R, 274/13 R, 9 R; 179/100.4

[56] References Cited

U.S. PATENT DOCUMENTS

| 4,138,121 | 2/1979 | Nakajima | 274/23 R |
| 4,170,360 | 10/1979 | Ohsawa | 274/23 R |

Primary Examiner—Harry N. Haroian
Attorney, Agent, or Firm—Lewis H. Eslinger; Alvin Sinderbrand

[57] ABSTRACT

A tone arm assembly provided with a motor for moving a tone arm in a horizontal direction with respect to a record disc, a servo circuit for keeping the moving velocity of the tone arm constant, and a positioning servo circuit to operate when the tone arm reaches a reproducing position, in which the positioning servo circuit and the velocity controlling servo circuit are combined together thereby to stop the tone arm quickly at a predetermined position.

2 Claims, 2 Drawing Figures

TONE ARM ASSEMBLY

BACKGROUND OF THE INVENTION

1. Field of the Invention

This invention relates generally to a tone arm assembly, and is directed more particularly to a novel tone arm assembly which is controlled with an electromagnetic force.

2. Description of the Prior Art

There is already known such a tone arm that an electro-magnetic force, for example, a driving force of a motor is utilized to move a tone arm in the horizontal and vertical directions relative to the surface of a record disc. The tone arm assembly of this kind requires a so-called positioning servo circuit in order to stop the tone arm at a predetermined position on the surface of a record disc and to start the reproducing. However, a system of using the positioning servo only has a drawback in that when the tone arm is rendered to stop on the surface of the record disc at a desired position, a vibration is apt to occur. In other words, a mere positioning servo provides a strength of stability in proportion to a distance from the desired stop position. If a position of a tone arm is taken as $x_i$, an initial velocity as $v_i$, and a desired position as a reference, the equation of motion can be expressed as follows:

$$m\frac{d^2x}{dt^2} + kx = 0 \tag{1}$$

A solution of the above equation is obtained as follows:

$$x = \frac{v_i}{\omega} \sin \omega t + x_i \cos \omega t \tag{2}$$

where $\omega = \sqrt{k/m}$.

As apparent from the above solution, in case of using only the positioning servo, there is no attenuation term in the above equation so that the tone arm becomes vibratile and will not stop at the desired position. Therefore, it is considered to provide a mechanical resistance to its rotating shaft in order to stop the tone arm at the desired position. However, the mechanical resistance is irregular at every mechanical portions and also a frictional force is exerted on the tone arm during its movement to cause a mechanical loss. Further, the assignee of this applicant has already proposed a method in U.S. Ser. No. 923,455 such that a motor is first driven at a constant velocity with a brake current being supplied thereto to move a tone arm from its rest position, and when the arm reaches a predetermined position, an arm driving circuit is cut off to stop the arm at the predetermined position by using a position detecting pulse generator, a counter for counting the pulse, and a D-A converter. According to this method, the arm can be stopped more smoothly as compared with the case of providing a mechanical resistance or frictional force. However, it requires the digital circuit for counting pulses, the converter for converting a digital signal into an analog signal, and a tank circuit for preventing ringing. Further, a positioning servo circuit is necessary in addition to a constant velocity servo circuit for the arm. As a result, its circuit arrangement becomes complicated.

SUMMARY OF THE INVENTION

It is an object of this invention to provide a tone arm assembly in which a tone arm can be smoothly moved to a predetermined position on the surface of a record disc.

It is another object of this invention to provide a tone arm assembly in which a tone arm can be stopped correctly at a predetermined position on the surface of a record disc.

It is a further object of this invention to provide a tone arm assembly having a feedback servo circuit for smoothly leading-in a tone arm to a predetermined position on a record disc, and means for detecting the arrival of the tone arm at the predetermined position, wherein an output of the position detecting means is supplied to the servo circuit so that the moving tone arm can be quickly stopped at the predetermined position.

It is a further another object of this invention to provide a tone arm assembly in which an electro-magnetic force is utilized to stop a tone arm at a predetermined position so that a mechanical friction is unnecessary.

It is an additional object of this invention to provide a tone arm assembly in which a tone arm can be quickly led to and stopped at a predetermined position without using a complicated circuit arrangement.

It is a still further object of this invention to provide a tone arm assembly in which a low frequency resonance of a tone arm can be prevented.

The above and other objects and features of the invention will appear more fully hereinafter from a consideration of the following description taken in connection with the accompanying drawings wherein one example is illustrated by way of example.

DESCRIPTION OF THE PREFERRED EMBODIMENT

A description will hereinafter be given on one embodiment of this invention with reference to the drawings.

Figure 1:
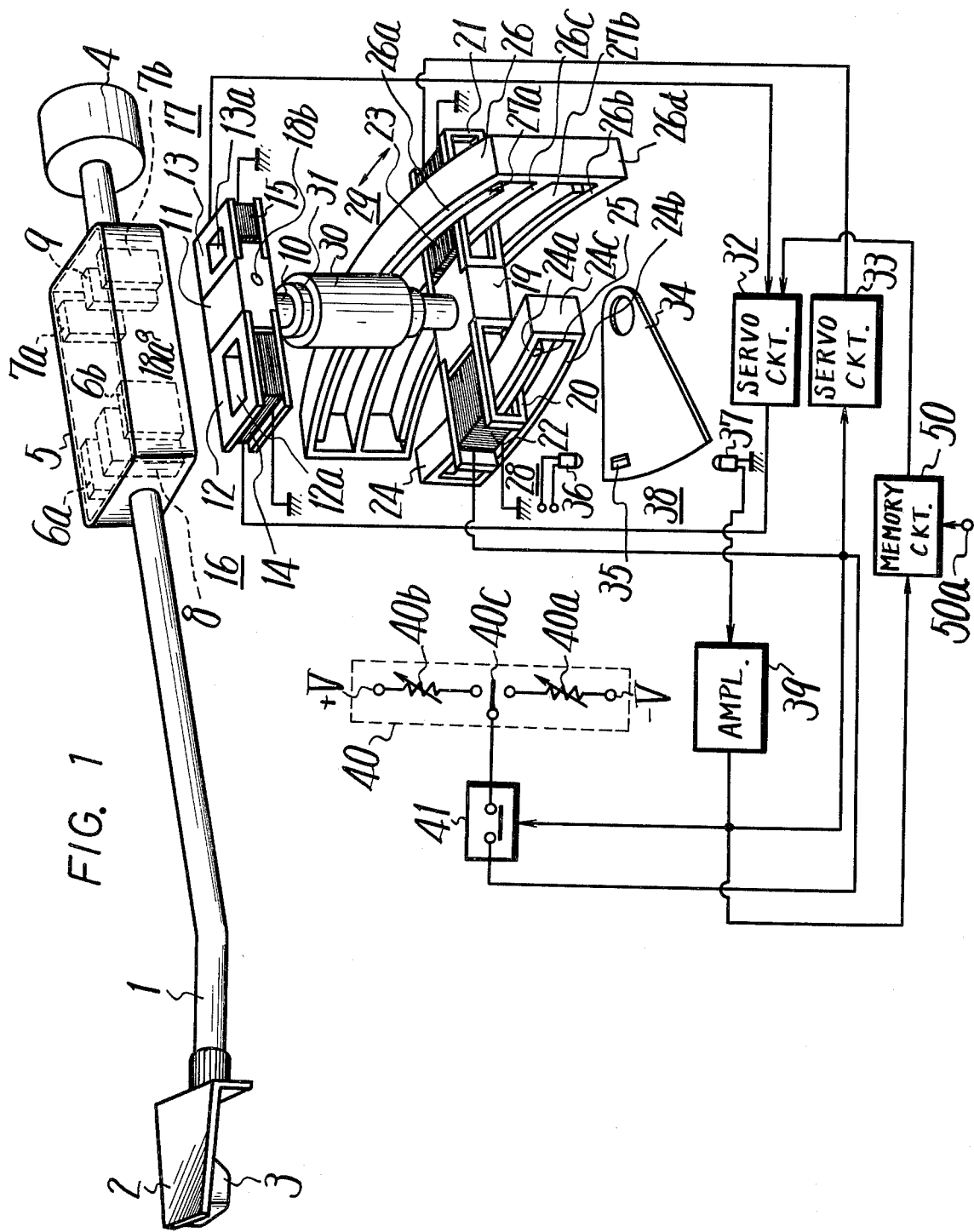
FIG. 1 is an exploded perspective view of a tone arm assembly according to this invention.

FIG. 1 shows a construction of a tone arm assembly of this invention, in which 1 designates a tone arm, 2 a head shell and 3 a cartridge. The tone arm 1 is provided at a predetermined position of its rear end with a counter weight 4, which may be omitted in this invention. Reference numeral 5 designates a case with its bottom opened. The tone arm 1 is extended in a predetermined direction but divided at its predetermined position into two parts, which are respectively fixed to the opposite sides of the case 5 as illustrated. A pair of permanent magnets 6a and 6b are provided in opposition to each other on the inner walls of the case 5 at its one side, while a pair of permanent magnets 7a and 7b are provided in opposition to each other on the inner walls of the same at its other side. Magnetic members 8 and 9 are respectively disposed between the magnets 6a and 6b and between the magnets 7a and 7b to form magnetic circuits. If the case 5 is made of a magnetic material, the magnetic members 8 and 9 can be formed in an integral manner with the case 5. In this case, the case 5 will serve both as a magnetic circuit and a yoke.

In FIG. 1, 10 represents a horizontal rotation shaft, which is loaded thereon with a coupling member 11. The coupling member 11 acts to move the tone arm 1 in a horizontal direction integrally with the rotation of the horizontal rotation shaft 10. The coupling member 11 is provided at its both sides with bobbins 12 and 13 having center openings 12a and 13a through which the magnetic members 8 and 9 are to be respectively engageable and disengageable. The bobbin 12 is wound thereabout with a vertical drive coil 14 and the bobbin 13 is wound thereabout with a vertical velocity detection coil 15. The magnets 6a and 6b, magnetic member 8 and vertical drive coil 14 are combined to form a first electro-magnetic means, or a vertical drive motor 16, which is adapted to move the arm 1 in a vertical direction with respect to a record disc (not shown) and to carry out various control operations. Further, the magnets 7a and 7b, magnetic member 9 and vertical velocity detection coil 15 are combined to form a first detecting means, or a vertical velocity detector 17, which is adapted to detect the velocity of the arm 1 in the vertical direction and to brake the vertical drive motor 16 for preventing a low frequency resonance of the vertical direction and the like. The vertical drive motor 16 and the vertical velocity detector 17 are disposed in a symmetric manner with respect to the shaft 10 so as not to have an electrical interaction therebetween. A flank of the case 5 and the corresponding flank of the coupling member 11 are respectively bored with apertures 18a and 18b at their corresponding positions. Thus, being mounted with the bobbin 12 wound by the vertical drive coil 14 and the bobbin 13 wound by the vertical detection coil 15, the coupling member 11 is engaged into the case 5 so that the magnetic members 8 and 9 may fit respectively into the openings 12a and 13a of the bobbins 12 and 13. Thereafter, a vertical-rotation pivotal shaft (not shown) is inserted into the aperture 18a of the case 5 and the aperture 18b of the coupling member 11 thereby to move the tone arm 1 vertically about this vertical-rotation pivotal shaft. In addition, if the vertical driving portion is exchanged in disposition with the vertical-velocity detecting portion, and the construction of the tone arm 1 including the vertical-rotation pivotal shaft and the like is properly designed, zero balance can be maintained so that the counter weight 4 becomes omissible.

Another coupling member 19 having bobbins 20 and 21 at its both sides is provided at the lower end of the horizontal rotation shaft 10. The bobbin 20 is wound thereabout with a horizontal detection coil 22, while the bobbin 21 is wound thereabout with a horizontal drive coil 23. There is provided a yoke assembly 24 formed of upper and lower yokes 24a and 24b and joint yokes 24c and 24c. The upper yoke 24a having a permanent magnet 25 attached on its inner surface is freely inserted in the bobbin 20 to derive a voltage from the coil 22 wound about the bobbin 20 in response to the horizontal movement of the arm 1. Meanwhile, there is provided a yoke assembly 26 formed of upper and lower yokes 26a and 26b, a center yoke 26c and joint yokes 26d and 26d. The center yoke 26c is freely inserted in the bobbin 21 wound with the horizontal drive coil 23, and permanent magnets 27a and 27b respectively fixed to the inner surfaces of the upper and lower yokes 26a and 26b are electro-magnetically coupled to the horizontal drive coil 23 thereby to reciprocate the bobbin 21 in the directions of arrow in response to the driving current flowing through the coil 23. The upper, lower and center yokes 26a, 26b and 26c of the yoke assembly 26 are bent in such a shape as a circular arc about an axis of the horizontal rotation shaft 10, and the bobbin 21 wound thereabout with the horizontal drive coil 23 is adapted to reciprocate as mentioned above without touching the center yoke 26c by keeping small intervals therefrom.

The horizontal detection coil 22, yoke assembly 24 and magnet 25 are combined to constitute a second detecting means, or a horizontal velocity detector 28. This detector 28 acts to detect the velocity of a horizontal drive motor 29, which will be described below, and to brake this motor 29. Further, the horizontal drive coil 23, yoke assembly 26 and magnets 27a and 27b are combined to constitute a second electro-magnetic means, or the horizontal drive motor 29. This horizontal drive motor 29 is adapted to drive the tone arm 1 through the horizontal rotation shaft 10 so that the arm 1 can achieve control functions such as cancelling of an inside force and controlling of a low frequency resonance of a horizontal component as well as lead-in, lead-out, return, etc. The horizontal drive motor 29 is disposed in a symmetrical manner with the horizontal velocity detector 28 and vertical drive motor 16, for example, right and left about the horizontal rotation shaft 10 so as to restrain an electrical interaction therebetween.

The horizontal rotation shaft 10 is held firmly but rotatably through a slidable member 31 such as a ball bearing by a base member 30, which is mounted on a board (not shown) on which the main body is placed. The yoke assemblies 24 and 26 are also fixed to the base member 30 so that they can be integrally constructed. In this example, only the vertical members are disposed on the baord, but the horizontal members can also be disposed on the board with the base member 30 being arranged at the lower end of the horizontal rotation shaft 10.

Further, servo circuits 32 and 33 are provided. The servo circuit 32 is served to feed-back a detected current from the vertical detection coil 15 to the vertical drive coil 14 to achieve a so-called motional feed back (hereinafter referred to as an MFB). Similarly, the servo circuit 33 is served to feed-back a detected current from the horizontal detection coil 22 to the horizontal drive coil 23 to achieve the MFB. These servo circuits 32 and 33 are connected to MFB operating buttons (not shown) so as to be externally operable.

A shutter 34 is provided to engage with the horizontal rotation shaft 10 so that it may rotate in synchronism therewith. The shutter 34 is provided therethrough with a window 35, which may correspond to a position for determining a playing position of the tone arm 1 according to the diameter of a record disc. A light emitting element 36 and a light sensing element 37 are disposed in opposition to each other so that the window 35 of the shutter 34 may pass therebetween. These elements 36 and 37 and shutter 34 are combined to form an optical position detector 38. An amplifier 39 including a comparator is connected between the output end of the light sensing element 37 and the input end of the servo circuit 33, and produces a position output signal when a detected signal from the position detector 38 becomes equal to a reference signal corresponding to a desired position which is established in advance.

In order to establish the horizontal rotating velocity of the tone arm 1, there is provided a velocity setting circuit 40, which consists of a first variable means 40a for moving the tone arm 1 to a predetermined direction at a constant velocity, a second variable means 40b for moving the tone arm 1 to a direction opposite to the former at a constant velocity, and a switch 40c for changing over these means. The first variable means 40a is connected to a terminal to be applied with a voltage −V, while the second variable means 40b is connected to a terminal to be applied with a voltage +V. The switch 40c is connected to one end of a normally closed switch circuit 41, which is turned off when the output of the position detector 38 is applied thereto through the amplifier 39. The other end of the switch circuit 41 is connected to the input end of the servo circuit 33, while the output end of the amplifier 39 is also connected to the input end of the servo circuit 33 and further connected to a memory circuit 50. The output end of this memory circuit 50 is connected through the servo circuit 32 to the vertical motor circuit. Thus, the memory circuit 50 drives the servo circuit 32 based upon the output of the amplifier 39 being stored therein to lower the tone arm 1 down onto the surface of the record disc. Upon completing the reproducing of the record disc by the tone arm 1, the memory circuit 50 is reset with a signal fed through a reset terminal 50a to reverse the rotation of the vertical drive motor 16 so that the tone arm 1 is lifted from the surface of the record disc.

Figure 2:
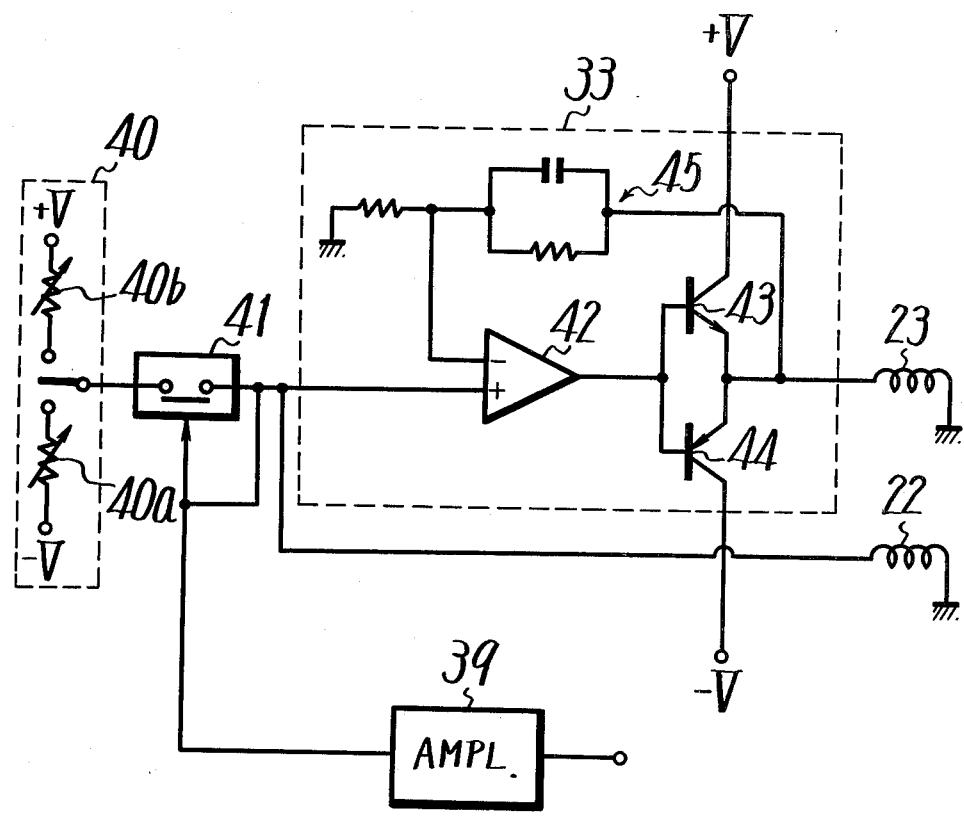
FIG. 2 is a practical circuit diagram of a servo circuit shown in FIG. 1.

The servo circuit 33 is practically constructed as shown in FIG. 2. That is, the servo circuit 33 is composed of an operational amplifier 42 having positive and negative input ends, NPN and PNP transistors 43 and 44 the bases of which are connected to the output end of the amplifier 42, and a feedback circuit 45 provided between the emitters of the respective transistors 43 and 44 and the negative input end of the operational amplifier 42. The positive input end of the operational amplifier 42 is connected to the horizontal detection coil 22, the output end of the amplifier 39, and the switch circuit 41. The emitters of the transistors 43 and 44 are also connected to the horizontal drive coil 23 of the horizontal drive motor 29. Further, the collector of the transistor 43 is connected to the terminal applied with the voltage +V and the collector of the transistor 44 is connected to the terminal applied with the voltage −V.

An operation of the above mentioned tone arm assembly of this invention will be below described. At first, a description will be given of a lead-in mode in which the tone arm 1 is moved from its rest position to a position above the record disc. Let it be assumed that the servo circuit 33 is in an operative condition and the switch 40c of the velocity setting circuit 40 is connected to the variable means 40a. Further, assuming that under the above condition the output of the operational amplifier 42 is fed to the base of the transistor 44 to make it conductive, the servo circuit 33 will produce an output signal corresponding to a voltage set by the variable means 40a. Accordingly, the tone arm 1 is moved toward the position above the record disc by the horizontal drive motor 29 to represent its lead-in state. At this lead-in state of the tone arm 1, an output voltage from the horizontal detection coil 22 corresponding to the moving velocity of the tone arm 1 is fed to the operational amplifier 42. Accordingly, when the tone arm 1 is going to move at a faster velocity, an output level of the operational amplifier 42 becomes high to increase an impedance of the transistor 44. As a result, a current flowing through the coil 23 of the horizontal drive motor 29 is decreased to reduce the moving velocity of the tone arm 1.

When the lead-in operation of the tone arm 1 is advanced and the cartridge 3 is located above the record disc, the shutter 34 is moved in response to the above position of the cartridge 3 and reaches a position where the light from the light emitting element 36 passes through its window 35 to the light sensing element 37. As a result, the element 37 produces a detected signal, which is fed to the amplifier 39. When this input voltage of the amplifier 39 reaches a predetermined value, the amplifier 39 produces an output which is fed to the switch circuit 41 to turn it off and also fed to the operational amplifier 42. As mentioned above, when the tone arm 1 is moved to the predetermined position, the bias voltage fed to the servo circuit 33 from the velocity setting circuit 40 will be shut off. However, the servo circuit 33 is simultaneously applied with the output of the amplifier 39 and the output of the coil 22. Thus, the operational amplifier 42 produces an output such as to turn-off the transistor 44 and to turn-on the transistor 43 so that a reverse current flows through the coil 23 of the horizontal drive motor 29 to stop the same. It will be noted that since the output from the coil 22 and the output from the amplifier 39 are simultaneously fed to the servo circuit 33, a stopping force corresponding to the rotation of the motor 29 is obtained. In other words, when the horizontal drive motor 29 is rotated at a higher velocity, a larger stopping force will be applied thereto. This force is expressed by a viscous resistance term, or an attenuation term, in the equation of motion. That is, the equation of motion at this time can be expressed as follows:

$$m\frac{d^2x}{dt^2} + kx + c\frac{dx}{dt} = 0 \tag{3}$$

A solution of this equation is obtained as follows:
In case of $$\zeta(\equiv \frac{c}{2\sqrt{mk}}) < 1, \tag{4}$$

$$x = x_0 e^{-\zeta\omega t}\cos(\sqrt{1-\zeta^2}\cdot\omega t - \phi)$$

In case of $\pi = 1$, $$x = (A + Bt)e^{-\omega t} \tag{5}$$

In case of $\zeta > 1$, $$x = e^{-\zeta\omega t}(Ae^{\omega\sqrt{\zeta^2-1}\cdot t} + Be^{-\omega\sqrt{\zeta^2-1}\cdot t}) \tag{6}$$

In this case, $x_0$, A, B and $\phi$ are constants determined by the initial condition. The above equations (4), (5) and (6) all include attenuation terms, and hence it can be understood that the tone arm 1 is quickly stopped by simultaneous application of MFB and positioning servo operations.

When the tone arm 1 is stopped at a predetermined horizontal position, the output from the amplifier 39 is applied to the memory circuit 50 to set the same. Then, the output of the memory circuit 50 is fed through the servo circuit 32 to the vertical drive motor 16 to drive the same so that the cartridge 3 of the tone arm 1 is lowered onto the surface of the record disc. The record disc is thus reproduced at this condition.

During the reproducing operation of the record disc, when the tone arm 1 causes abnormal vibration in the horizontal direction due to, for example, warping or eccentric state of the record disc, or low frequency resonance, the horizontal detection coil 22 generates a voltage in response to the above vibration. This voltage is fed through the servo circuit 33 to the horizontal drive motor 29 to control it so as to cancel the vibration. As a result, the tone arm 1 is prevented from being vibrated. Similarly, when the tone arm 1 causes abnormal vibration in the vertical direction, the vertical detection coil 15 produces a voltage in response to the above vibration. This voltage is fed through the servo circuit 32 to the vertical drive motor 16 to control it so as to cancel the vibration. Accordingly, the abnormal vibration of the tone arm 1 in the vertical direction is also prevented. When the reproducing is finished, a detected signal is applied to the memory circuit 50 through the reset terminal 50a to reset the same, so that the vertical drive motor 16 is actuated to lift the tone arm 1. Further, the horizontal drive motor 29 is reversely rotated by a proper means to lead-out the tone arm 1.

As apparent from the above description, according to the tone arm assembly of this invention, the positioning servo and MFB operations are used at the same time to carry out the positional control of the tone arm, so that its construction and circuit are simplified and also the positional control can be surely performed.

It will be apparent that many modifications and variations may be effected without departing from the scope of the novel concepts of this invention.

We claim as our invention:

1. A tone arm assembly comprising:
    a tone arm;
    a first motor mechanically coupled to said tone arm for moving said tone arm in the horizontal direction with respect to a record disc;
    a first motor drive means including a first servo circuit for energizing said first motor in such a manner that said tone arm is moved from an inoperative rest position to an inoperative up-position above a reproducing position of said record disc, or vice versa;
    a first detecting means coupled to said tone arm for detecting the velocity of said tone arm and for generating a first electrical output in response to said velocity;
    means for supplying said first electrical output to said first servo circuit;
    a second detecting means coupled to said tone arm for detecting a predetermined arm position and for generating a second electrical output; and
    means for applying said second electrical output to said first servo circuit;
    wherein said first motor drive means further includes a biasing circuit for biasing said first servo circuit so as to energize said first motor at a predetermined velocity, and a switch means connected between said biasing circuit and said first servo circuit, said switch means being controlled with said second electrical output derived from said second detecting means so as to shut off a connection between said first servo circuit and said biasing circuit.

2. A tone arm assembly according to claim 1, further comprising:
    a second motor mechanically coupled to said tone arm for moving said tone arm in the vertical direction with respect to the record disc;
    a second motor drive means including a second servo circuit for energizing said second motor in such a manner that said tone arm is moved from an inoperative position to a reproducing position of said record disc, or vice versa;
    a memory circuit supplied with said second electrical output from said second detecting means for producing an output signal so as to energize said second motor through said second servo circuit; and
    a third detecting means mechanically coupled to said tone arm for generating a third electrical output to be applied to said second servo circuit; whereby a low frequency vibration of said tone arm is compressed by operations of said first and second servo circuits.

* * * * *